United States Patent [19]
Lee et al.

[11] Patent Number: 5,326,386
[45] Date of Patent: Jul. 5, 1994

[54] HYDRAULIC RESERVOIR WITH GAS/OIL SEPARATOR

[75] Inventors: Leung Lee, Brooklyn; James J. Pavlica, East Northport, both of N.Y.

[73] Assignee: Grumman Aerospace Corporation, Bethpage, N.Y.

[21] Appl. No.: 45,602

[22] Filed: Apr. 9, 1993

[51] Int. Cl.$^5$ .............................................. B01D 53/22
[52] U.S. Cl. ................................................ 96/6; 96/7; 96/12; 96/174
[58] Field of Search ...................... 96/6, 7, 10, 12, 174, 96/187

[56] References Cited
U.S. PATENT DOCUMENTS

| | | | |
|---|---|---|---|
| 3,332,216 | 7/1967 | Stern | 96/12 |
| 3,355,861 | 12/1967 | Webb | 96/12 |
| 3,872,014 | 3/1975 | Schell | 96/12 X |
| 4,986,837 | 1/1991 | Shibata | 96/6 |

Primary Examiner—Charles Hart
Attorney, Agent, or Firm—Bacon & Thomas

[57] ABSTRACT

A reservoir for use in a hydraulic circuit is disclosed which includes a passive gas separating medium to separate gas from the hydraulic fluid as it circulates through the reservoir. The gas separating medium, which may be a membrane-type diffuser, is permeable to air, but not hydraulic fluid. This allows entrained air to diffuse through the membrane element after which it may be expelled to the atmosphere. The membrane diffuser is located within the reservoir housing in a low-pressure portion of the hydraulic circuit in a space between spaced apart double walls of the reservoir such that hydraulic fluid returning to the reservoir must first pass through the membrane. The membrane may have several concentric or spiral layers, depending upon the capacity of the circuit. Gas separated from the hydraulic fluid is withdrawn from the membrane diffuser structure and may be vented to atmosphere through a valve associated with the reservoir housing.

16 Claims, 2 Drawing Sheets

HYDRAULIC RESERVOIR WITH GAS/OIL SEPARATOR

BACKGROUND OF THE INVENTION

The invention relates generally to the field of hydraulic circuits and, more particularly, to a gas/oil separator associated with a hydraulic reservoir to separate gas from the hydraulic fluid.

The presence of gas, such as air, in hydraulic fluid is known to cause problems in hydraulic-operated devices. The circuits for such hydraulically actuated devices typically include a hydraulic reservoir, as well as a pump for circulating the hydraulic fluid and hydraulic-operated components, such as actuators, within the circuit. Typical problems caused by the presence of a gas, such as air, are pump cavitation, slow or erratic response of the hydraulic components, and increase in the horsepower consumption within the circuits which results in higher operating temperatures for the fluid.

Of special concern is the removal of gas from a hydraulic fluid in hydraulic circuits located in a weight and/or space restricted vehicle, such as an airplane. One of the current techniques for removing gas from the hydraulic fluid in aircraft fluid circuits is to place an aspirator, which operates on the principles of the Bernoulli effect, in the hydraulic circuit at a location outside the hydraulic fluid reservoir. These aspirators mechanically remove air from the hydraulic fluid. However, due to the limited capacity of the aspirator, only a small amount of the supersaturated fluid can be deaerated at any given time. Additionally, aspirator devices require an external power source and contain moving parts (which thereby inherently decrease the reliability of the aspirator). They are orientation-sensitive and must be positioned in the hydraulic circuit at a location outside of the reservoir, thereby significantly increasing the size of the "envelope" of the hydraulic circuit.

A system is needed which can effectively separate gas from the hydraulic fluid circulating within a hydraulic circuit and which, at the same time, minimizes any increase in the size of the hydraulic circuit "envelope".

SUMMARY OF THE INVENTION

A flow through reservoir for use in a hydraulic circuit is disclosed which includes a passive gas separating medium to separate gas from the hydraulic fluid as it circulates through the reservoir. The gas separating medium, which may be a membrane-type diffuser, is permeable to air, but not to hydraulic fluid. This allows entrained air to diffuse through the membrane element after which it may be expelled to the atmosphere.

The membrane diffuser is located within the reservoir housing in a low-pressure portion of the hydraulic circuit. It is known that a gas, such as air, will come out of the air/hydraulic-mixed fluid solution as the fluid flows back into the return system, which is at a lower system pressure than the remainder of the hydraulic circuit.

The membrane diffuser is located within a space between spaced apart double walls of the reservoir such that hydraulic fluid returning to the reservoir must first pass through the membrane. The membrane may have several concentric or spiral layers, depending upon the required capacity of the circuit. Gas separated from the hydraulic fluid is diffused into the membrane structure and may be vented to atmosphere through a valve associated with the reservoir housing. Since the membrane is associated with the reservoir housing, the overall size of the "envelope" of the hydraulic circuit is not greatly increased.

It is an object of this invention to provide an improved device for removing gas from a hydraulic fluid circulating in a hydraulic fluid circuit.

It is a further object to provide a device for removing gas from a hydraulic fluid in a hydraulic fluid circuit which minimizes any increase in both the weight and size of the hydraulic circuit "envelope".

It is a further object of this invention to provide a device for removing gas from hydraulic fluid in a hydraulic circuit which has a minimum number of moving parts so as to maximize the reliability of the hydraulic system.

DETAILED DESCRIPTION OF THE PREFERRED EMBODIMENT

Figure 1:
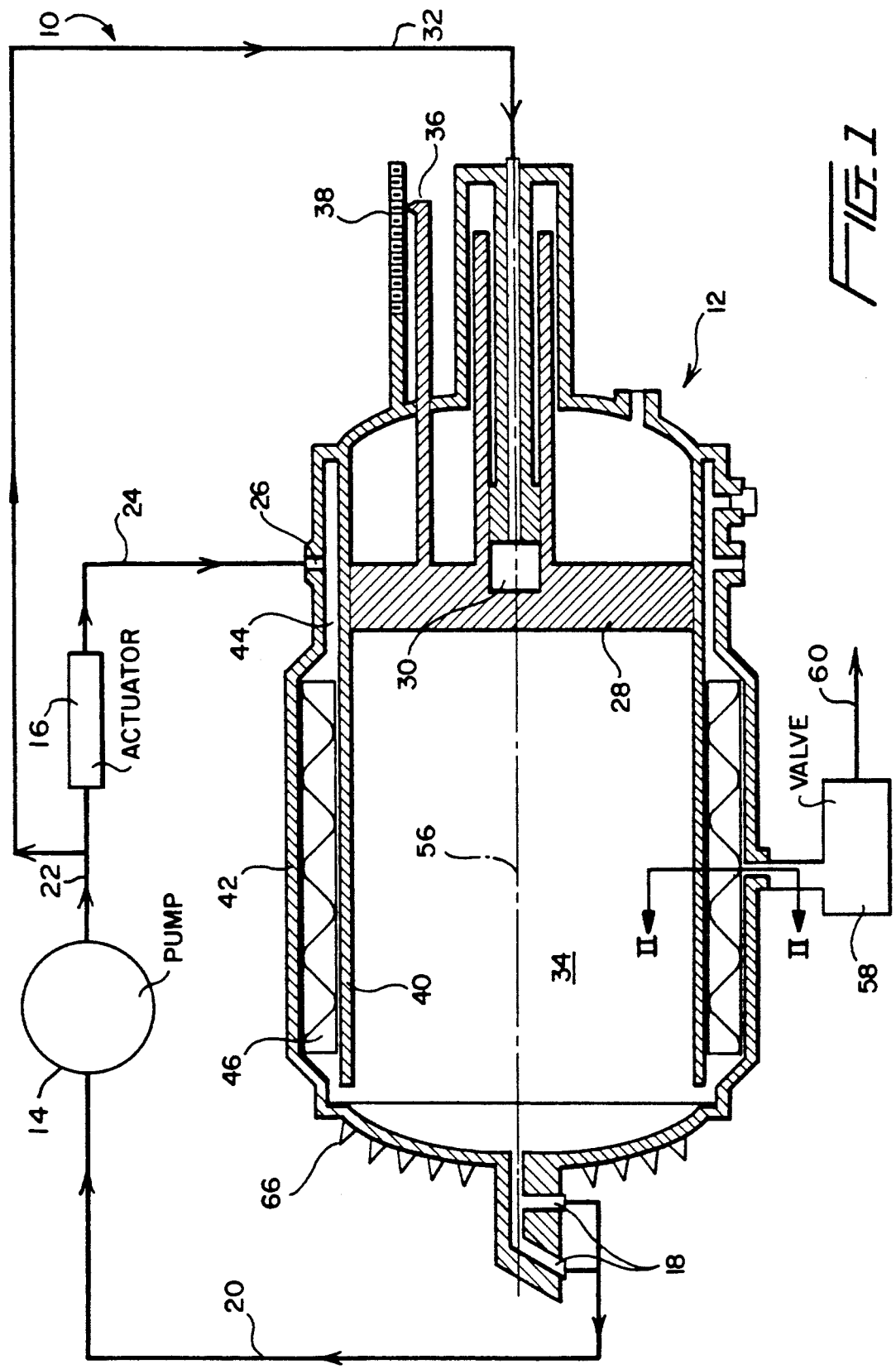
FIG. 1 is a schematic diagram of the hydraulic circuit including a reservoir according to the present invention, which is illustrated in cross section.

A hydraulic circuit 10 is schematically illustrated in FIG. 1 and comprises a hydraulic fluid reservoir 12, to be described in more detail hereinafter, a pump 14 and a hydraulic actuator 16. Actuator 16, which may comprise any known hydraulic actuator, is connected to a movable element (not shown) to be moved by the actuator. Although only one such actuator 16 is illustrated in FIG. 1, it is to be understood that the pump 14 may supply pressurized hydraulic fluid to more than one actuator or hydraulic circuit without exceeding the scope of this invention.

Hydraulic reservoir 12 has outlets 18 which are connected to pump 14 via conduit 20. It is to be understood that the hydraulic reservoir 12 may supply hydraulic fluid to more than one pump via outlets 18. Pump 14 supplies pressurized hydraulic fluid to the actuator 16 through conduit 22. Return conduit 24 returns the hydraulic fluid from the actuator 16 to the inlet 26 of the hydraulic reservoir 12.

Pump 14 also supplies pressurized hydraulic fluid to the high pressure portion, chamber 30, of the hydraulic reservoir 12, via conduit 32, to maintain the hydraulic pump 14, inlet pressure. (Requirement for reservoir pressurization.) Pressurization may also be attained by any suitable means such as pneumatic or mechanical.

Piston 28 is slidably mounted within the hydraulic reservoir 12 and is urged toward the left, as seen in FIG. 1, by pressurized hydraulic fluid supplied to chamber 30 via conduit 32 from pump 14, via conduit 22. Piston 28 maintains the fluid within fluid chamber 34 within predetermined pressurized limits. The position of piston 28 within the hydraulic reservoir 12 may be ascertained by visual inspection of the relationship between pointer 36, attached to the piston 28 and indicia plate 38, attached to the housing of hydraulic reservoir 12.

Hydraulic reservoir 12, which may have a generally circular cross-sectional configuration, has spaced apart double sidewalls 40 and 42 which define therebetween a generally annular space 44. As can be seen in FIG. 1, space 44 communicates with the hydraulic fluid inlet 26 as well as fluid chamber 34 to enable the returning hydraulic fluid to pass from the inlet 26 into the fluid chamber 34.

Disposed within space 44 is a membrane diffuser structure 46 which separates the gas from the hydraulic fluid prior to return into the fluid chamber 34. Membrane diffuser structure 46, which may be a self-contained cartridge, is located between the spaced apart sidewalls 40 and 42 and extends along at least a portion of the length of the hydraulic reservoir 12.

Figure 2:
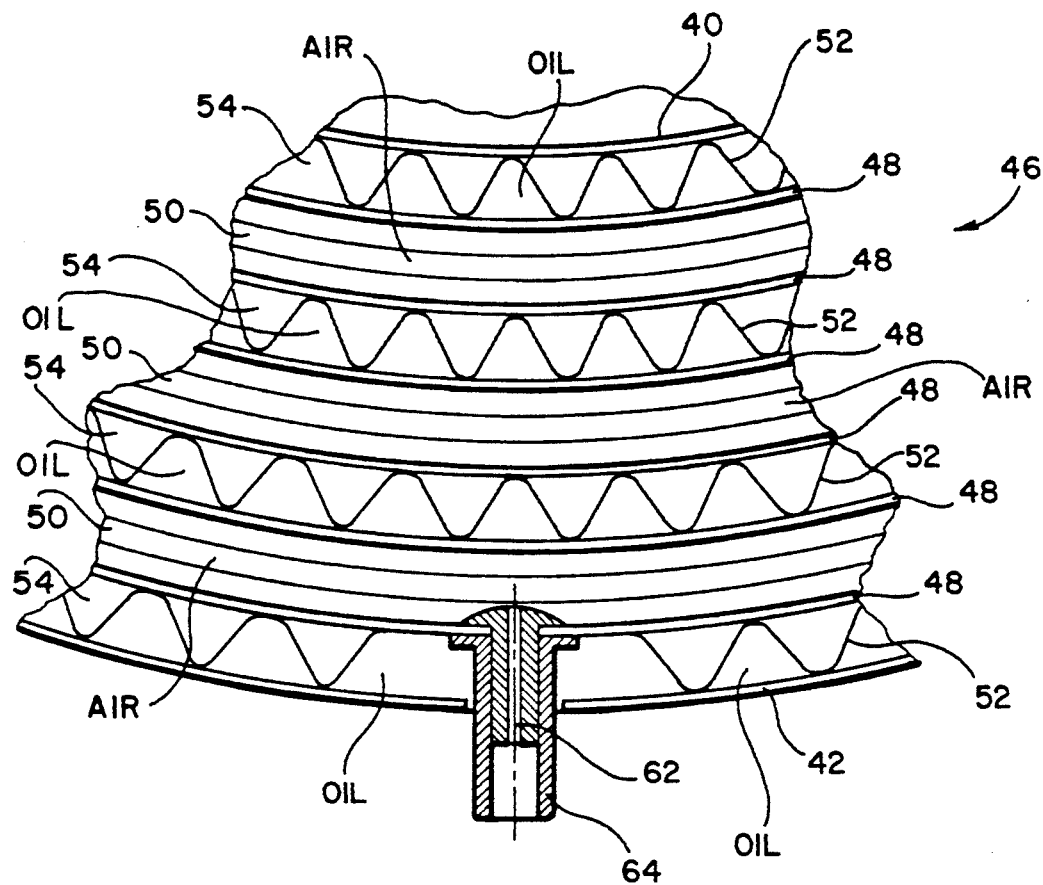
FIG. 2 is an enlarged, partial, cross sectional view taken along line II—II in FIG. 1.

The cross section of the membrane diffuser structure 46 is illustrated in FIG. 2, wherein it can be seen that the membrane diffuser structure comprises a plurality of closed-layers of semi-permeable membrane 48 and a plurality of layers of woven mesh material 50, within the closed-layers of semi-permeable membrane 48, which permit air flow therethrough. Corrugated partitions 52 separate a membrane layer 48 from the inner sidewall 40, a membrane layer 48 from the outer sidewall 42, as well as adjacent closed-layers of the membrane 48. This structure generally defines hydraulic oil flow passages 54 which alternate radially. Air permeates through membrane layers 48 into the woven mesh material. 50. The hydraulic oil passages alternate either concentrically with the air passages, or each may be in spiral configuration about the center line 56 of the hydraulic reservoir 12.

Air separated from the hydraulic fluid by the membrane diffuser structure 46 is withdrawn therefrom through valve 58 and may be vented to atmosphere as indicated by arrow 60. Valve 58 may be connected to the air passage of membrane diffuser 46 via passageway 62 defined in sleeve elements 64. It is to be understood that valve 58 need not be physically attached to the reservoir 12, but may be located at some distance therefrom and be interconnected therewith via a conduit. Valve 58 is preferably a one-way valve which will permit air to flow from the membrane diffuser structure 46, but which will prevent any flow in the reverse direction from vent line 60.

In certain hydraulic systems, it may be desirable to maintain a normal system fluid operting temperature. This can be achieved by incorporating a plurality of heat transfer fins 66 at various locations on the external surface of the hydraulic reservoir 12. Cooling can also be achieved by providing passages through the housing of the hydraulic reservoir to allow cooling media to flow through these passages in parallel flow, or counterflow to the flow direction of the hydraulic fluid. If used on an aircraft, the heat transfer may be achieved by allowing fuel to pass through the hydraulic reservoir cooling passages.

The invention has been found to be particularly applicable to aircraft hydraulic systems. Since the gas/oil separating system has no moving parts, it is inherently highly reliable. Also, the integration of the membrane diffuser structure within the hydraulic reservoir permits a very large membrane surface area to optimize performance, while at the same time minimizing the weight and size increases to the hydraulic system "envelope". When utilized with a piston-type hydraulic reservoir (bootstrap) as shown in FIG. 1, the membrane diffuser structure is located upstream of the piston on the return side of the hydraulic system, rather than on the suction side where the pressure drop through the membrane diffuser structure would be more critical. The location of the membrane diffuser structure also ensures that all of the hydraulic fluid flows through the device to optimize its performance.

By incorporating the membrane diffuser structure in a flow-through type reservoir, as illustrated in FIG. 1, all of the hydraulic return fluid will pass through the membrane diffuser structure. Since the membrane diffuser structure is located upstream from the hydraulic pump, the membrane diffuser will assist in protecting the hydraulic pump from failure due to cavitation by removing the gas from the hydraulic fluid before it reaches the pump.

The hydraulic reservoir is also in a low pressure region of the hydraulic system. It is known that air, either entrained or dissolved, tends to come out of the solution during depressurization. Air dissolved in hydraulic fluid in the high pressure region will come out of solution as the hydraulic fluid flows back to the return system, which is at a lower pressure. In the invention, air that comes out of solution, either in the form of free or entrained air, will now come into contact with the membrane diffuser structure device in the reservoir. Free air will diffuse through the membrane element, which is permeable to air, and will be vented to the atmosphere. Dissolved air will continue to come out of solution until the solubility of air in the hydraulic fluid reaches the equilibrium at that specific pressure as the fluid flows through the device.

By using the membrane diffuser structure in association with the hydraulic reservoir according to the invention, air elimination takes place continuously regardless of orientation of the hydraulic reservoir and the reliability of the hydraulic system is inherently increased, since no mechanical moving parts are involved. The efficiency of the gas removal is also maximized by maximizing the area of the membrane diffuser means through its association with the largest element of the hydraulic system, the hydraulic reservoir.

The foregoing is provided for illustrative purposes only and should not be construed as in any way limiting this invention, the scope of which is defined solely by the appended claims.

We claim:

1. A reservoir to supply hydraulic fluid to a hydraulic circuit to meet the needs of the hydraulic circuit, said reservoir including a housing, a fluid inlet, a fluid outlet and defining a fluid chamber such that said inlet and outlet communicate with said fluid chamber, the reservoir comprising: a piston located in the reservoir housing and acting on fluid in the fluid chamber so as to pressurize the fluid in the fluid chamber; a passive gas separating medium operatively associated with the reservoir housing for separating gas from hydraulic fluid circulating between said inlet, said chamber and said outlet; and means for venting gas separated from the hydraulic fluid by said gas separating medium to a zone external to the hydraulic circuit.

2. A reservoir as claimed in claim 1, wherein said gas separating medium comprises a membrane diffuser means.

3. A reservoir as claimed in claim 1, wherein said gas separating medium is disposed within said reservoir housing.

4. A reservoir as claimed in claim 3, wherein the housing comprises means to direct hydraulic fluid through the gas separating medium.

5. A reservoir as claimed in claim 4, wherein said housing comprises at least a portion having spaced apart double walls and wherein said gas separating medium is disposed in the space between said double walls, said space comprising part of said hydraulic circuit and forming a passage through which hydraulic fluid flows.

6. A reservoir as claimed in claim 1, wherein said venting means comprises a port through said reservoir housing, and valve means associated with said port for controlling flow of gas through said port.

7. A reservoir as claimed in claim 6, wherein said valve means comprises a one-way valve including means for blocking gas flow into the gas separating medium from a point outside the hydraulic circuit and means for permitting gas flow from the gas separating medium to said zone external of the hydraulic circuit.

8. A reservoir as claimed in claim 7, wherein said valve means includes means for blocking flow of liquid from said hydraulic circuit to a zone external of the hydraulic circuit.

9. A reservoir as claimed in claim 1, wherein said housing includes a sidewall, and said gas separating medium comprises a self-contained cartridge assembly conforming geometrically with and secured directly to at least a portion of said side wall in coextensive relationship with said sidewall portion.

10. A reservoir as claimed in claim 9, wherein said gas separating medium comprises a membrane diffuser means.

11. A reservoir as claimed in claim 10, wherein said gas separating medium self-contained cartridge assembly is enclosed by said housing.

12. A reservoir as claimed in claim 11, wherein said housing comprises at least a portion having spaced part double walls enclosing said fluid chamber, and wherein said cartridge assembly is disposed between said double walls said space comprising part of said hydraulic circuit and forming a passage through which hydraulic fluid flows.

13. A reservoir as claimed in claim 1, further comprising a heat exchanger means operatively associated with the housing for cooling the fluid within the reservoir housing.

14. A reservoir as claimed in claim 13, wherein said heat exchanger means comprises cooling fins attached to the housing.

15. A reservoir as claimed in claim 1 further comprising actuating means acting on the piston so as to maintain a predetermined pressure in the hydraulic fluid in the fluid chamber.

16. A reservoir as claimed in claim 15 wherein the actuating means comprises: a piston chamber defined by the piston; and, conduit means connected to the piston chamber so as to supply pressurized hydraulic fluid to the piston chamber.

* * * * *